US009596832B2

(12) United States Patent
Davison, III et al.

(10) Patent No.: US 9,596,832 B2
(45) Date of Patent: Mar. 21, 2017

(54) COOLING PET CHEW TOY WITH EDIBLE INSERTS

(71) Applicant: Maze Innovations, Inc., Montreal, MO (US)

(72) Inventors: George McConnell Davison, III, Pittsburgh, PA (US); Peter Arthur Meier, Pittsburgh, PA (US); Jason Reed Rogge, Belle Vernon, PA (US); Colin Derek Curry, Allison Park, PA (US); Matthew David McClatchey, Harwick, PA (US)

( * ) Notice: Subject to any disclaimer, the term of this patent is extended or adjusted under 35 U.S.C. 154(b) by 66 days.

(21) Appl. No.: 14/508,611

(22) Filed: Oct. 7, 2014

(65) Prior Publication Data

US 2015/0114309 A1    Apr. 30, 2015

Related U.S. Application Data

(60) Provisional application No. 61/896,143, filed on Oct. 28, 2013.

(51) Int. Cl.
*A01K 29/00* (2006.01)
*A01K 15/02* (2006.01)

(52) U.S. Cl.
CPC .... *A01K 15/026* (2013.01); *A46B 2200/1086* (2013.01)

(58) Field of Classification Search
CPC ... A01K 15/026; A01K 15/025; A01K 5/0114

(Continued)

(56) References Cited

U.S. PATENT DOCUMENTS 5,947,061 A *  9/1999  Markham ............ A01K 15/026
                                                    119/710
6,415,741 B2 *  7/2002  Suchowski .......... A01K 15/026
                                                    119/709

(Continued)

*Primary Examiner* — Trinh Nguyen
(74) *Attorney, Agent, or Firm* — Craig R. Rogers; Simple IP Law, P.C.

(57) ABSTRACT

The principles of the present inventive concepts relate to pet toys in general and, in particular, to a chewable pet toy such as those commonly used by dogs. The chew toy may be constructed and adapted to allow the toy to be cooled or frozen to provide a cooling effect to the animal during the chewing process. The toy may be further constructed and adapted to incorporate at least one recessed or open area that is configured to receive and retain an edible food product therein which may be dislodged and consumed by the animal during the chewing process. The chew toy may comprise a main body, which may consist of two half-sections defining a sealed interior volume that encases an inner core. A non-toxic fluid may also be contained within the interior volume to allow the toy to be frozen. An external surface of the main body may comprise a plurality of small protrusions to provide a cleaning or massaging effect to the animal's teeth and gums. A receptacle may be formed through the outer surface of the main body to receive and hold an edible food product, or dog treat, in the open area and allow the treat to be consumed by the animal. The main body may comprise a durable, pliant, puncture resistant material, such as a thermoplastic rubber, to allow the chew toy to be used for repeated and extended periods of times.

12 Claims, 6 Drawing Sheets

(58) Field of Classification Search
USPC ..... 119/709, 707, 710, 711, 708, 702, 51.01
See application file for complete search history.

(56) References Cited

U.S. PATENT DOCUMENTS

| | | | |
|---|---|---|---|
| 8,978,590 B2* | 3/2015 | Nunn ............................ | 119/707 |
| 2005/0268861 A1* | 12/2005 | Ritchey ................ | A01K 15/026 |
| | | | 119/707 |
| 2008/0314331 A1* | 12/2008 | DeGhionno ......... | A01K 5/0114 |
| | | | 119/709 |
| 2010/0064983 A1* | 3/2010 | Ritchey ................ | A01K 15/025 |
| | | | 119/707 |
| 2011/0226191 A1* | 9/2011 | Curry .................. | A01K 15/025 |
| | | | 119/707 |
| 2012/0240866 A1* | 9/2012 | Taylor .................. | A01K 15/026 |
| | | | 119/710 |

* cited by examiner

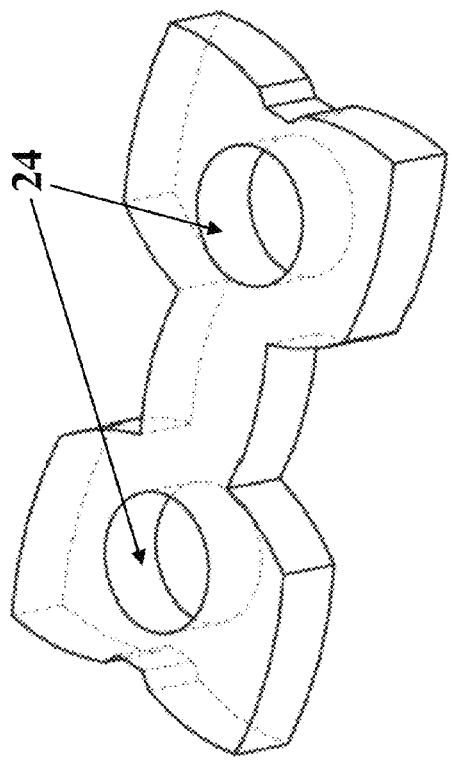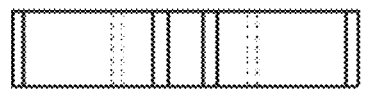
FIG. 3
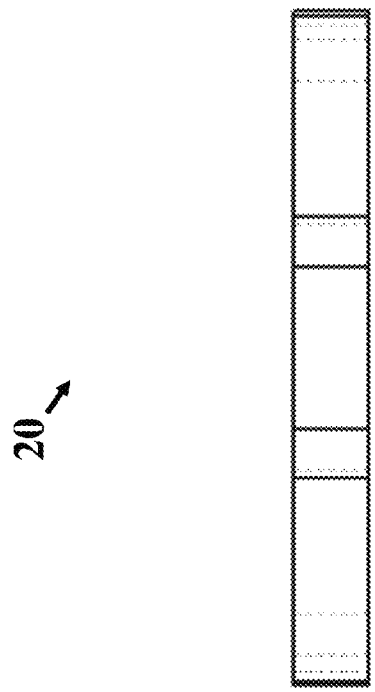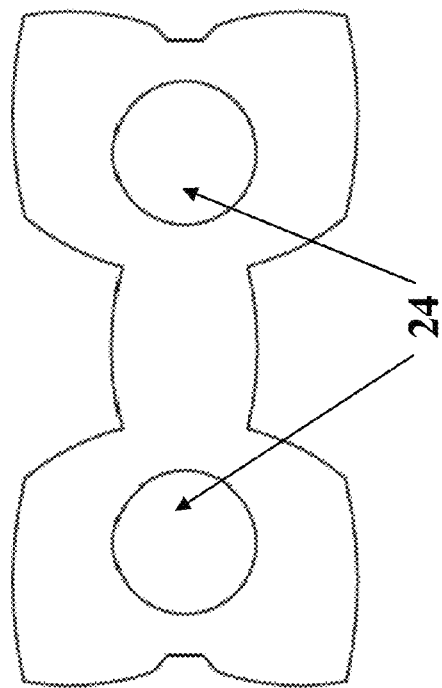

COOLING PET CHEW TOY WITH EDIBLE INSERTS

PRIORITY CLAIM

This application is a nonprovisional of, and claims priority from, U.S. Provisional Patent App. Ser. No. 61/896,143, filed Oct. 28, 2013, the contents of which are incorporated herein by reference in their entirety.

BACKGROUND OF THE INVENTIVE CONCEPTS

The present inventive concepts relate generally to pet toys, and specifically, to chewable pet toys constructed and adapted to provide cooling relief to an animal's mouth.

There are numerous varieties of chewable pet toys. Many are made of edible materials that are destroyed in the process of chewing. Many others are made of non-destructible materials and may provide a noise when chewed or a structure that cleans the animal's teeth. In addition, some toys have been adapted to hold and dispense a small quantity of fluid which provides the animal with hydration while chewing on the toy. It would be desirable, however, to have a reusable, chewable pet toy that can provide both cooling relief and include an edible treat for the animal.

It is therefore an object of the present inventive concepts to provide a reusable chew toy for an animal which may be cooled or frozen to provide a cooling sensation to the animal's mouth.

It is a further object of the present inventive concepts to provide a reusable chew toy for an animal which holds an edible food product that may be consumed by the animal during chewing.

BRIEF SUMMARY OF THE INVENTIVE CONCEPTS

The present inventive concepts provide a reusable animal chew toy which can, for example, be cooled or frozen to provide a cooling sensation to the animal's mouth. A pet toy constructed according to principles of the present inventive concepts may further incorporate a receptacle or other structure configured to receive and retain an edible food product therein, and further configured to allow the animal to dislodge and consume the food product while chewing on the toy. The chew toy may, for example, comprise a main body constructed of a pliable, durable outer housing (or sheathing) that encases an inner core. The inner core may, for instance, comprise a foam-type or other absorbent material. A fluid, such as purified water, may be contained within the main body. When the toy has been cooled or frozen, the chew toy can provide a cooling effect to the animal's mouth.

In addition to the foregoing features, the outer housing may have a plurality of small protrusions (or nubs) along its outer surface to provide a tactile surface for stimulating the animal's mouth and/or cleaning the animal's teeth while chewing. The outer housing may further comprise at least one receptacle configured to receive and retain an edible food product. The receptacle may consist of a recessed area that is sized and constructed to hold the food product therein. The receptacle may further be configured to prevent inadvertent removal of (i.e., to securely retain) the food product while allowing for it to be dislodged and consumed by the animal through the chewing process.

The outer housing may comprise a durable, pliant material. In a preferred embodiment, the material may be a thermoplastic rubber. However, any of a number of materials or substances may be used to form the outer housing. In one embodiment, the outer housing may be formed in the shape of a bone. Any desired shape, however, is possible within the scope of the inventive concepts. Regardless of the shape, one or more receptacles may be provided at an appropriate location(s) in the toy, such as near each of the longitudinal ends in the bone-shaped embodiment to receive and hold edible food product(s).

An inner core may be encased within an interior volume of the outer housing. The interior volume may further retain one or more of a variety of desired fluids. In a preferred embodiment, the inner core may comprise a die-cut polyurethane foam or other desired material. For instance, any type of absorbent material could be used for the inner core. A quantity of fluid, such as purified water, may be contained within the toy body and be at least partially absorbed by the inner core. The fluid preferably assists the toy in providing a cooling effect to the animal when the liquid is cooled or frozen.

BRIEF DESCRIPTION OF DRAWINGS

The foregoing and additional objects, features, and advantages of the present inventive concepts will become more readily apparent from the following detailed description of preferred embodiments, made with reference to the accompanying drawings, in which:

FIG. 3 provides somewhat schematic perspective, top, and side views of an inner core of the pet toy of FIG. 1, illustrating additional principles of the present inventive concepts;

DETAILED DESCRIPTION OF THE INVENTIVE CONCEPTS

Various features, benefits, and arrangements of the present inventive concepts are shown and illustrated in the accompanying drawings by way of example embodiments. Additional features, benefits, and configurations will be readily apparent to those of ordinary skill in the art based on this disclosure; and all such features, benefits, and arrangements are within the scope of the present inventive concepts. Various example embodiments will now be described in detail with reference to the accompanying drawings.

Figure 1:
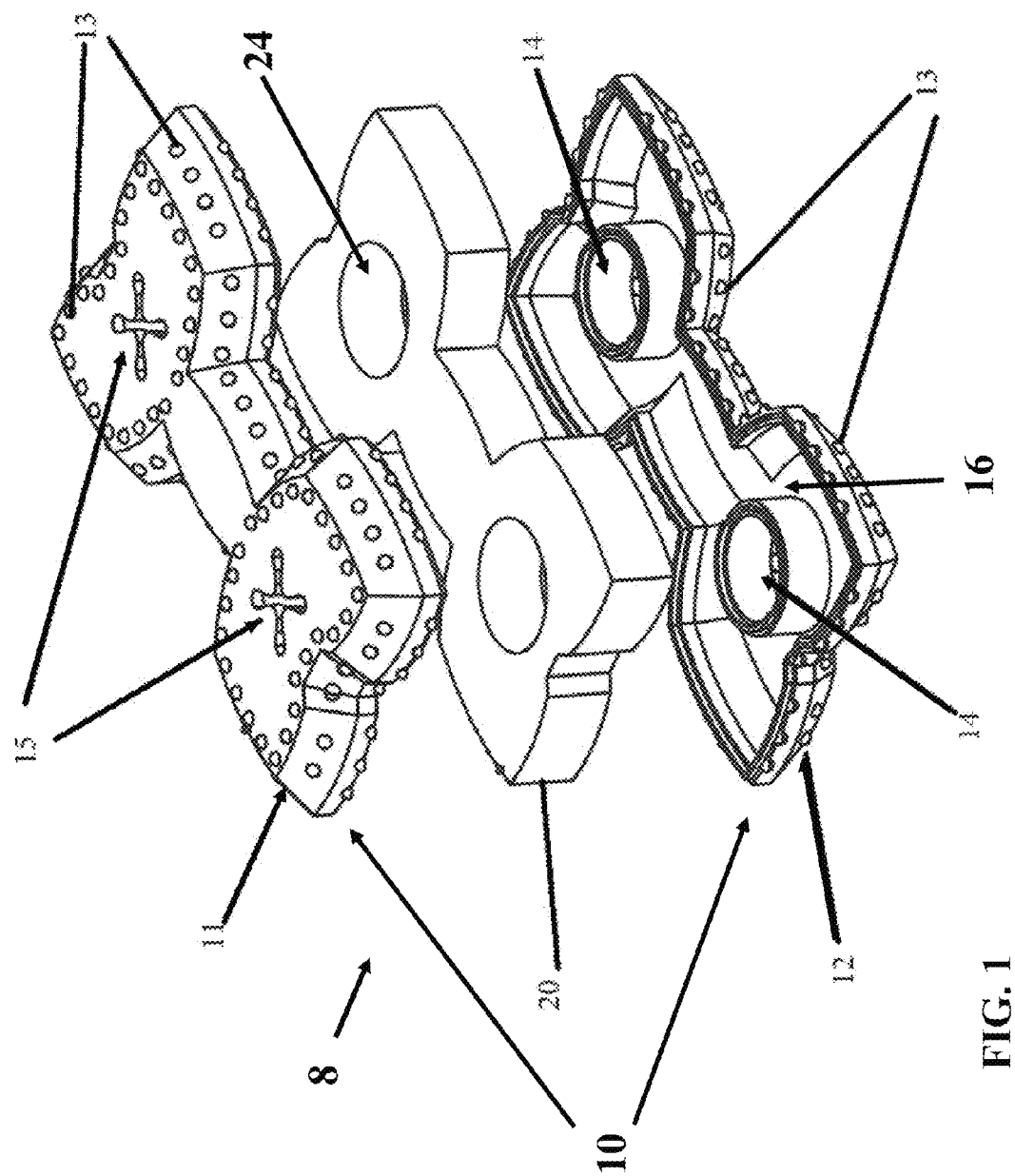
FIG. 1 is a somewhat schematic exploded perspective view of a preferred embodiment of a pet toy constructed according to various principles of the present inventive concepts.
Figure 2:
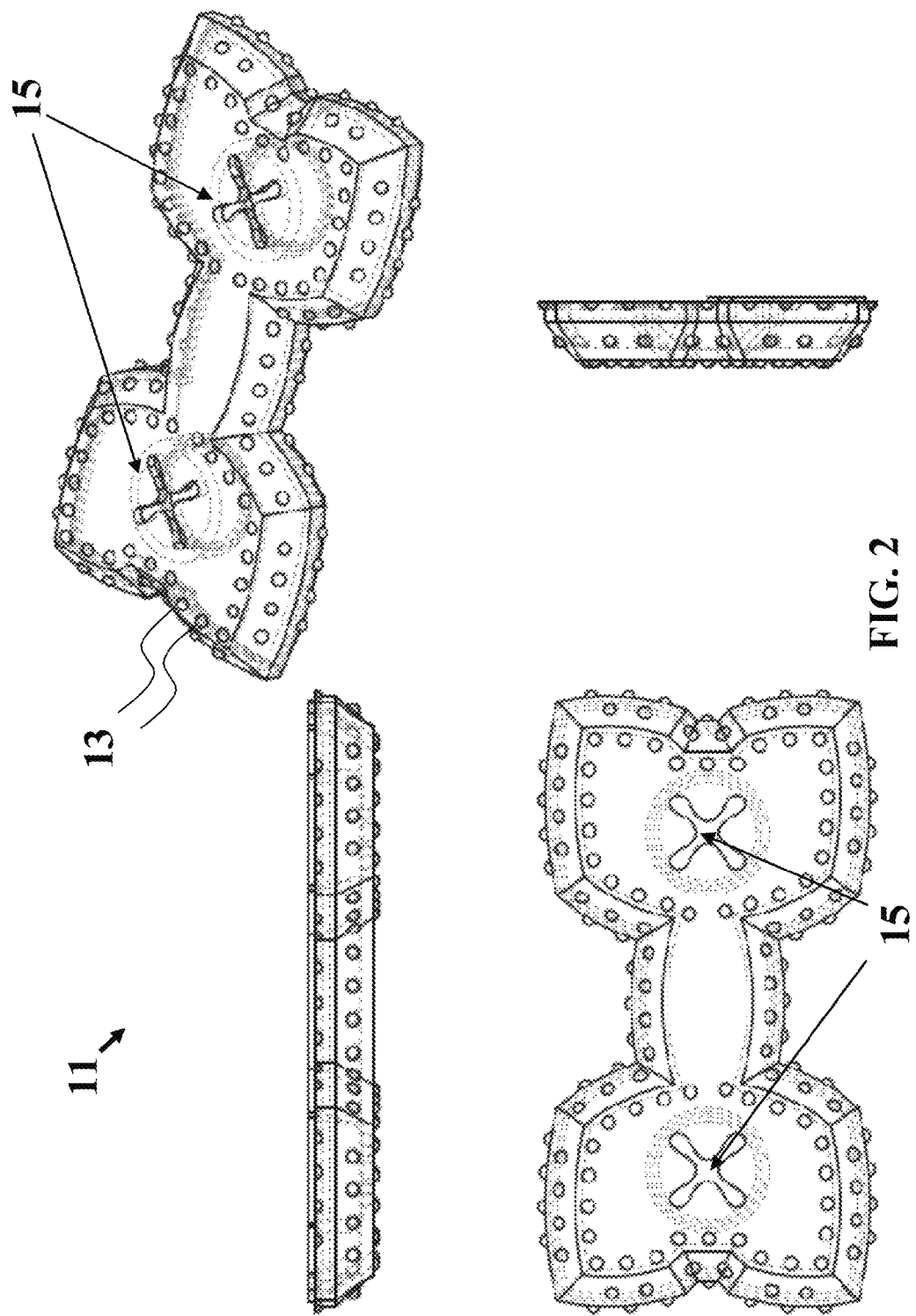
FIG. 2 provides somewhat schematic perspective, top, and side views of an outer shell or housing of the pet toy of FIG. 1, further illustrating additional features of the present inventive concepts.

FIG. 1 is a somewhat schematic exploded perspective view of a pet toy 8 constructed according to one embodiment of the present inventive concepts. FIG. 2 provides detailed perspective, top, and side views of one half shell 11 of the outer housing 11, 12 of the embodiment shown in FIG. 1.

Referring to FIGS. 1 and 2, a cooling pet chew toy 8 may be formed having a main body 10 in the shape of a bone, but any desired shape could be utilized within the scope of the inventive principles. The main body 10 may comprise an outer housing having two sections 11, 12 (i.e., half shells). The two sections may include, for instance, an upper shell 11 and a lower shell 12, or left and right side shells 11, 12, respectively (see, e.g., FIGS. 5 and 6). The two half shells 11, 12 may be substantially identical to each other. The outer housing 11, 12 is preferably formed from a resilient material that is pliant enough to allow the shape of the toy 8 to be compressed by a chewing action of the animal, yet durable (i.e., long-lasting, non-degradable, and/or non-destructible) enough to enable the toy to be reused numerous times.

In the embodiment shown in FIGS. 1 and 2, for example, the outer housing 11, 12 may be constructed from two injection molded thermoplastic rubber bodies, wherein the thermoplastic rubber material is approximately 0.1 inches in thickness. The two bodies 11, 12 may be sealed together along corresponding peripheral edges to form a water tight seal, with the inner core 20 arranged therebetween. The sealing mechanism may, for instance, comprise a tongue-in-groove fastening mechanism for mating the two half shells 11, 12 together. An adhesive or other affixing mechanism may be used to ensure the two halves 11, 12 remain securely connected together throughout the life of the product 8.

An outer or external surface of the outer housing 11, 12 preferably comprises a plurality of small protrusions 13 (or nubs) which provide a tactile exterior surface structure for the toy 8. At least one recessed or open area 14 may be integrated into the main body 11, 12. The recessed area 14 is preferably sized and configured to enable it to hold a small edible food product which may be consumed by the animal while chewing on the toy 8.

In some embodiments, for example, the recessed area 14 may be an open cylindrical area approximately 1 inch in diameter. The outer housing 11, 12 preferably covers the open recessed area 14 and may include a receptacle 15 corresponding to the open area 14. The receptacle 15 may, for example, comprise a cross-cut opening in a thin film of the outer sheathing 11, 12 covering the open area 14. The covering material for the receptacle 15 is preferably flexible enough to allow a food product such as an edible insert 16 (see FIG. 4) to pass into the receptacle 15 yet rigid enough to retain the food product within the open area 14.

FIG. 3 provides somewhat schematic perspective, top, and side views of an inner core 20 of the toy 8 shown in FIG. 1. As illustrated in FIG. 1, the inner core 20 is preferably encased within the outer housing 11, 12. Referring now additionally to FIG. 3, in the preferred embodiment, the inner core 20 may be formed of a die cut polyurethane foam. Numerous alternate materials, including, for example, cloth, a natural or synthetic sponge, or other absorbent material(s), may, however, be used to form the inner core 20 without deviating from the scope of the present inventive concepts. A fluid (not shown), such as purified water or other fluid, for example, is also preferably encased within the outer housing 11, 12, and may be at least partially absorbed by the inner core 20.

The inner core 20 may be sized and shaped to occupy a large portion of the interior volume 16 of the toy 8. In this embodiment, the inner core 20 is shaped to match the shape of the outer housing, i.e., bone-shaped. The inner core 20 may also have one or more openings 24 formed therethrough. A location of the opening(s) 24 may correspond to that of the open area 14.

The inner core 20 preferably provides structural stability to the toy 8 and further minimizes the amount of fluid required to be contained within the toy 8 to allow the toy to be frozen in a substantially rigid shape. The fluid contained within the outer housing 11, 12 is preferably purified water, but may be any other desirable, non-toxic fluid, for example. The quantity of fluid contained within the interior volume 16 of the toy 8 is preferably sufficient to allow the toy 8 to be frozen into a rigid structure, yet preferably occupies less than an entirety of the interior volume 16 to allow for expansion of the fluid. The interior volume 16 may be sealed and isolated from the open area 14 to prevent liquid from the interior volume from escaping into the open area 14.

Figure 4:
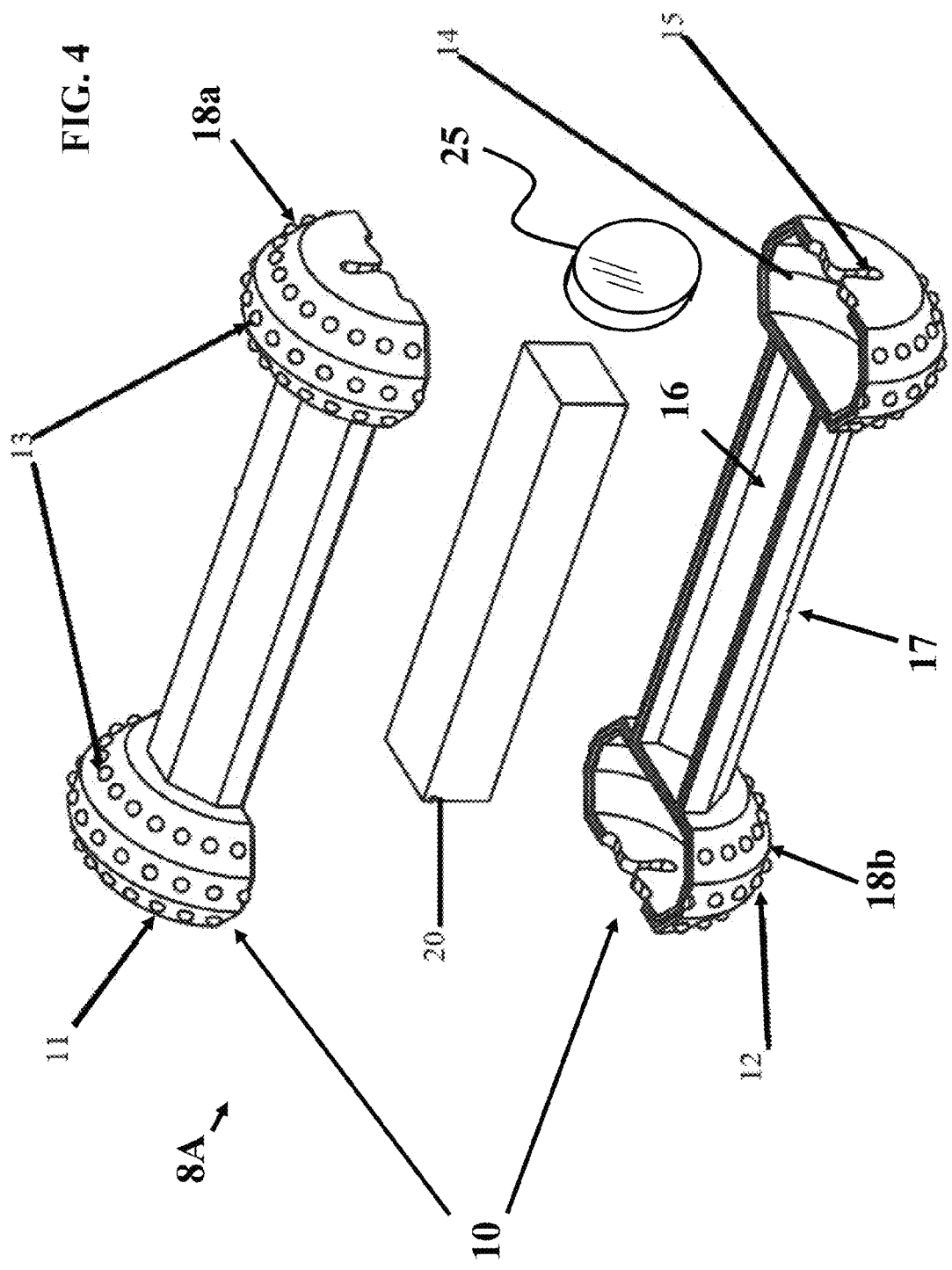
FIG. 4 is a somewhat schematic exploded perspective view of a second embodiment of a pet toy constructed according to principles of the present inventive concepts.
Figure 5:
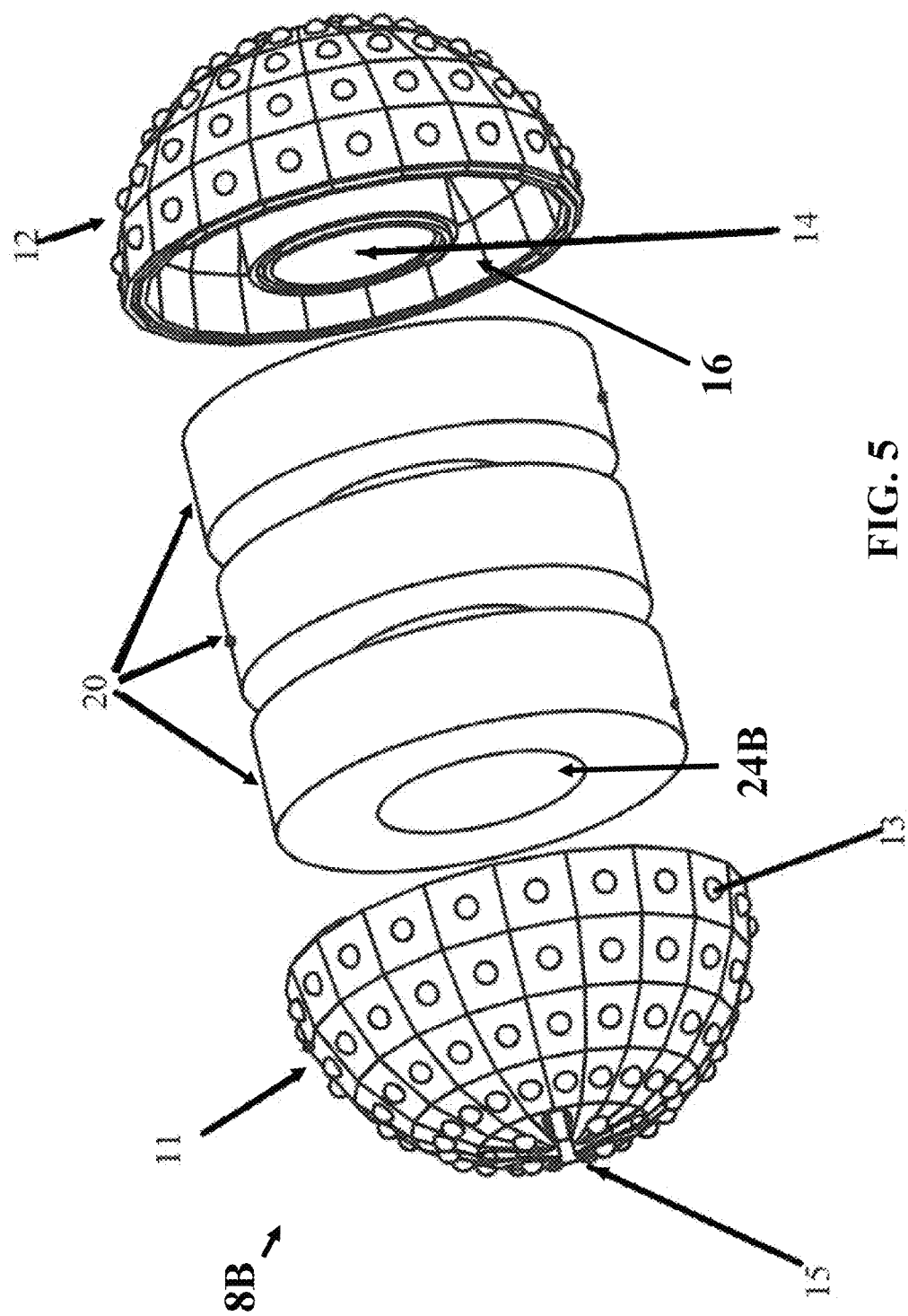
FIG. 5 is a somewhat schematic exploded perspective of another embodiment of a pet toy constructed according to principles of the present inventive concepts.
Figure 6:
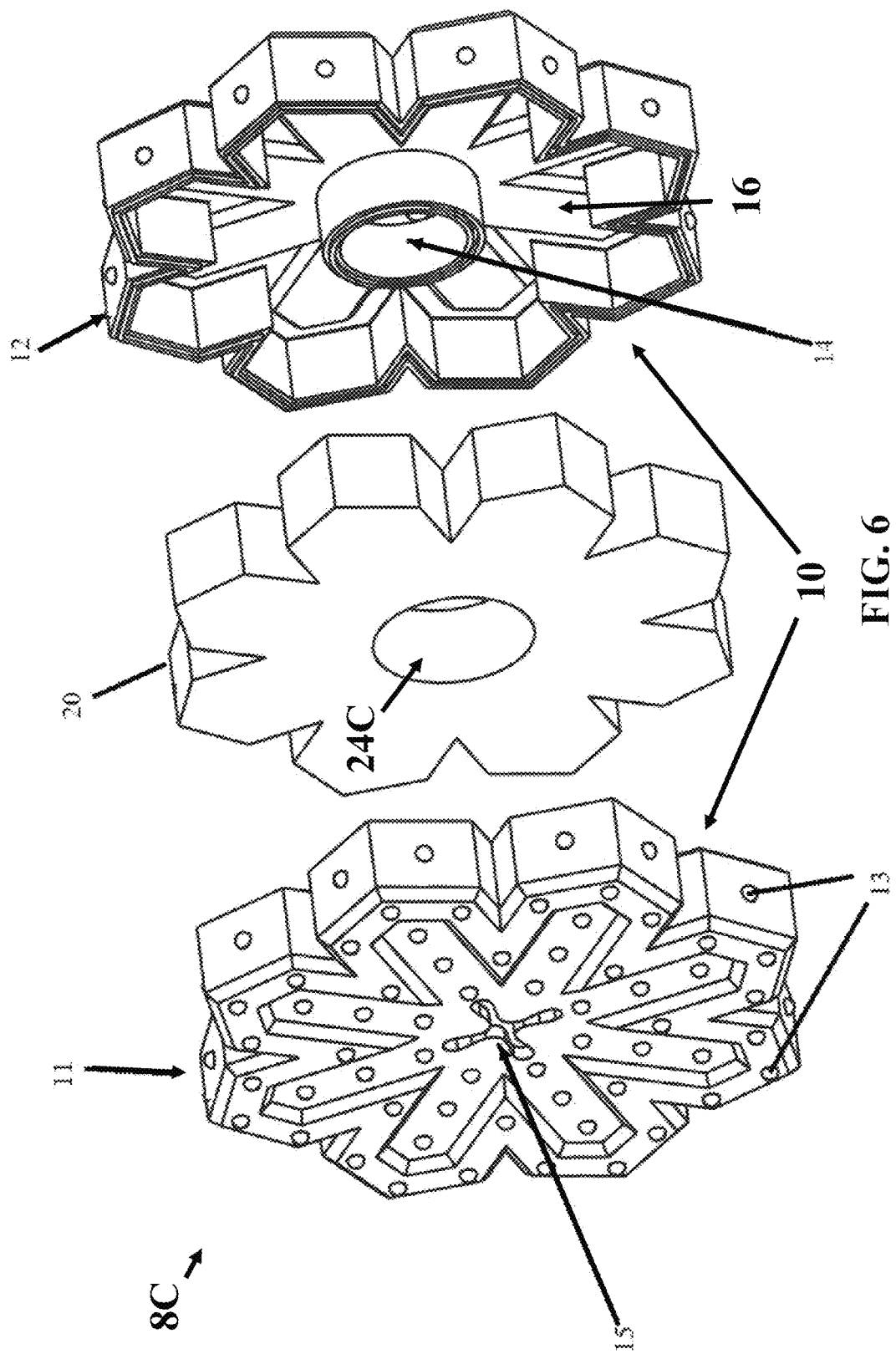
FIG. 6 is a somewhat schematic exploded perspective view of yet another embodiment of a pet toy according to principles of the present inventive concepts.

FIGS. 4, 5, and 6 are somewhat schematic exploded perspective views of chewable pet toys 8A, 8B, and 8C, respectively, constructed according to alternative embodiments incorporating principles of the present inventive concepts.

Referring to FIG. 4, in an alternative embodiment, the toy 8A may have a main body 10 configured with a dumbbell-like shape with two larger circular ends 18a, 18b and a narrower middle stem 17 between the two ends 18a, 18b. As with the embodiment described earlier, the outer housing 11, 12 may be formed from two half sections. The two half sections may, for example, include an upper shell 11 and a lower shell 12. An inner core 20 may be arranged within an interior volume 16 in the central stem portion 17 of the toy 8A, with one or both of the circular ends 18a, 18b comprising an open area 14 for holding an edible insert 25. A receptacle 15 may further comprise an opening through an end wall of the outer housing 11, 12 to permit the edible insert 25 to be inserted into the open area 14. Protrusions or nubs 13 may also be provided at various positions along an outer surface of the outer housing 11, 12, such as on the circular ends 18a, 18b and/or the stem 17, to provide a tactile exterior surface for stimulating the animal's mouth during chewing. The interior volume 16 may be sealed and isolated from the open area 14 to prevent liquid from the interior volume from escaping.

Referring to FIG. 5, in another embodiment, a cooling pet chew toy 8B may be a ball-shaped toy. Again, the outer housing 11, 12 may comprise two half sections. The inner core 20B may comprise one or more circular or cylindrical structures 20, each having an opening 24B formed therethrough at a location corresponding to the open area 14. The recessed area 14 may therefore extend into the opening 24B in the inner core 20. In addition to the inner core 20, a fluid (not shown) may also be housed within a sealed interior volume 16 of the toy 8B, and the fluid may be at least partially absorbed by the inner core 20. A receptacle 15 may be formed in one or both ends of the toy 8B to receive and hold an edible insert 16 (see FIG. 4) within the open area 14. Protrusions or nubs 13 may again be provided at various positions along the outer surface of the housing 11, 12 to provide a tactile exterior surface for stimulating the animal's mouth during chewing.

Referring now to FIG. 6, in a still further embodiment, the main body 10 of the pet toy 8C may comprise a star or snowflake-like shape. The outer housing 11, 12 may again comprise two half sections configured to be fitted and sealed together to form the main body 10 of the toy 8C. An inner core 20 may be arranged between the two half sections 11 and 12 and may be sized and shaped to fit within an interior volume 16 of the outer housing 11, 12. The inner core 20 may also be star or snowflake shaped. A fluid (not shown) may also be housed within the interior volume 16.

An opening 24C may be formed through a central portion of the inner core 20 to communicate with a recessed area 14 formed on one or both of the half sections 11 and 12. A receptacle 15 may comprise an opening formed through one or both half sections 11 and/or 12 to receive an edible insert 16 (see FIG. 4) therethrough to be housed within the recessed area 14. Protrusions or nubs 13 may be provided at various positions along the outer surface of the outer housing 11, 12 to provide a tactile external surface for stimulating the animal's mouth during chewing.

According to principles of the present inventive concepts, therefore, a durable chew toy may be provided having a firm but flexible outer housing that contains an inner core and fluid in a sealed interior volume. A receptacle is preferably provided in the chew toy to receive and house an edible insert therein. A receptacle opening can be provided to permit the edible insert to be inserted through the outer housing and retained in an open area within the main body.

The principles of the present inventive concepts have been shown and described with reference to various example embodiments thereof. It should be further apparent to those skilled in the art that numerous additional changes, variations, modifications, and other uses and applications to the apparatus are possible that do not depart from the spirit and scope of the inventive concepts. For instance, numerous shapes, sizes, and configurations are within the contemplation of the present inventive concepts, and those concepts are only to be limited by the spirit and scope of the appended claims.

What is claimed is:

1. A cooling pet chew toy comprising:
   an outer housing having an interior volume defined therein and an opening receptacle through the outer housing;
   an inner core arranged within the interior volume, wherein the inner core is shaped to occupy at least half of the interior volume;
   a fluid contained within the interior volume, wherein the fluid has a sufficient volume such that when cooled or frozen it provides a cooling effect to an animal chewing the pet toy;
   an open area located within the outer housing but isolated from the interior volume; and an open located within the inner core, said opening in the inner core corresponding to the open area and the opening receptacle, wherein said open area, said opening and said opening receptacle receive an edible insert therein to be consumed by the animal chewing the pet toy.

2. The pet toy of claim 1, wherein the outer housing comprises two half sections.

3. The pet toy of claim 1, wherein the inner core comprises an absorbent material configured to absorb at least a portion of the fluid.

4. The pet toy of claim 1, wherein the inner core comprises a die cut polyurethane foam.

5. The pet toy of claim 1, wherein the fluid is purified water.

6. The pet toy of claim 1, wherein the outer housing comprises two bone-shaped half sections sealed together.

7. The pet toy of claim 1, wherein the inner core comprises an opening corresponding to the open area.

8. The pet toy of claim 1, further comprising a receptacle opening arranged through the outer housing proximal to the open area.

9. The pet toy of claim 8, wherein the receptacle opening comprises a cross-shaped opening through the outer housing.

10. The pet toy of claim 8, wherein the receptacle comprises a structure configured to permit the edible insert to be inserted into the open area and to retain the edible insert within the open area until the toy is chewed by the animal.

11. The pet toy of claim 1, wherein said outer housing comprises a tactile external surface.

12. The pet toy of claim 11, wherein the tactile external surface comprises a plurality of nubs to stimulate an animal's mouth while chewing the pet toy.

* * * * *